April 13, 1954 — A. B. BELL — 2,675,056
AUXILIARY COLLAPSIBLE SEAT
Filed June 1, 1949 — 3 Sheets-Sheet 1
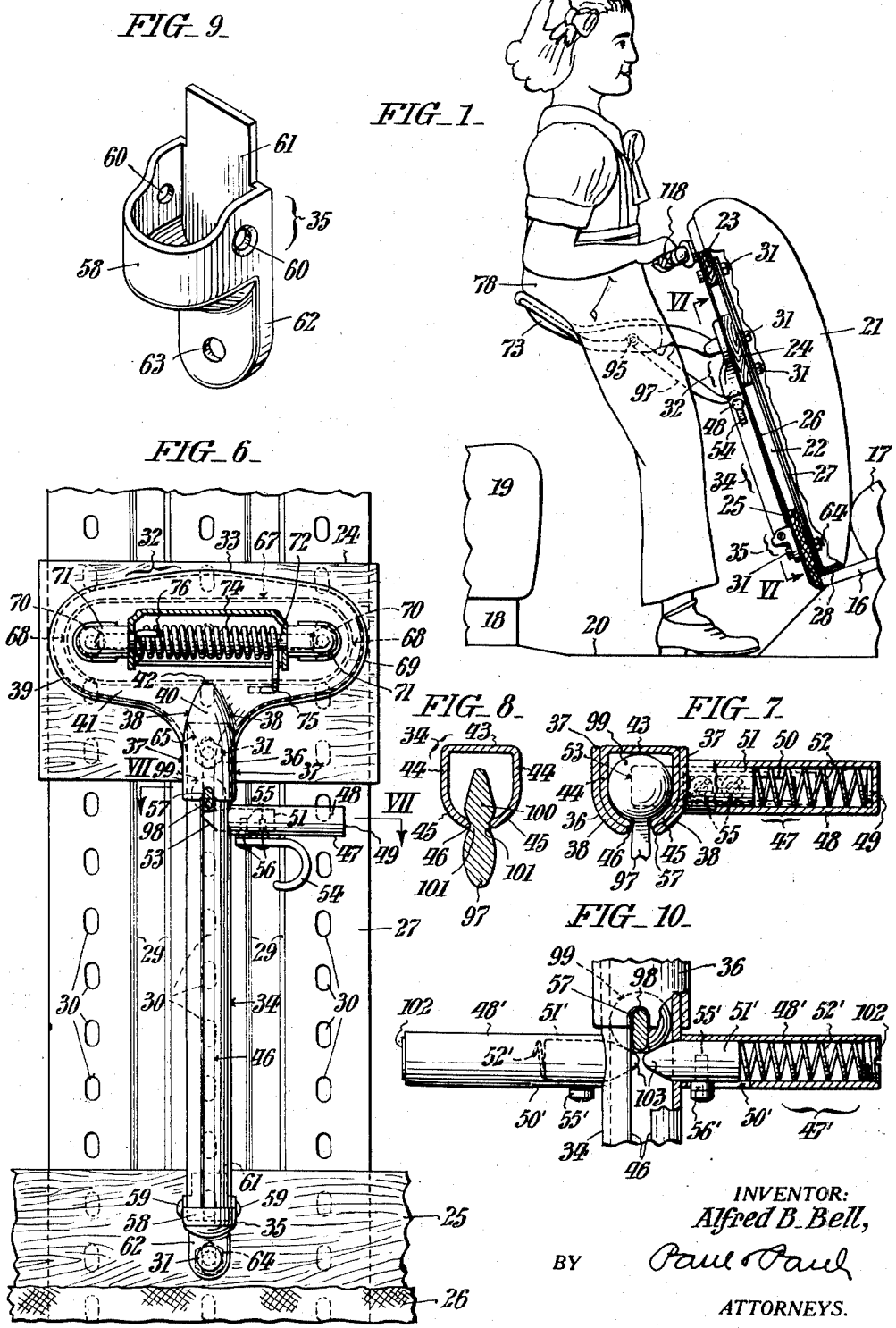
INVENTOR:
Alfred B. Bell,
BY Paul & Paul
ATTORNEYS.

April 13, 1954 — A. B. BELL — 2,675,056
AUXILIARY COLLAPSIBLE SEAT
Filed June 1, 1949 — 3 Sheets-Sheet 2
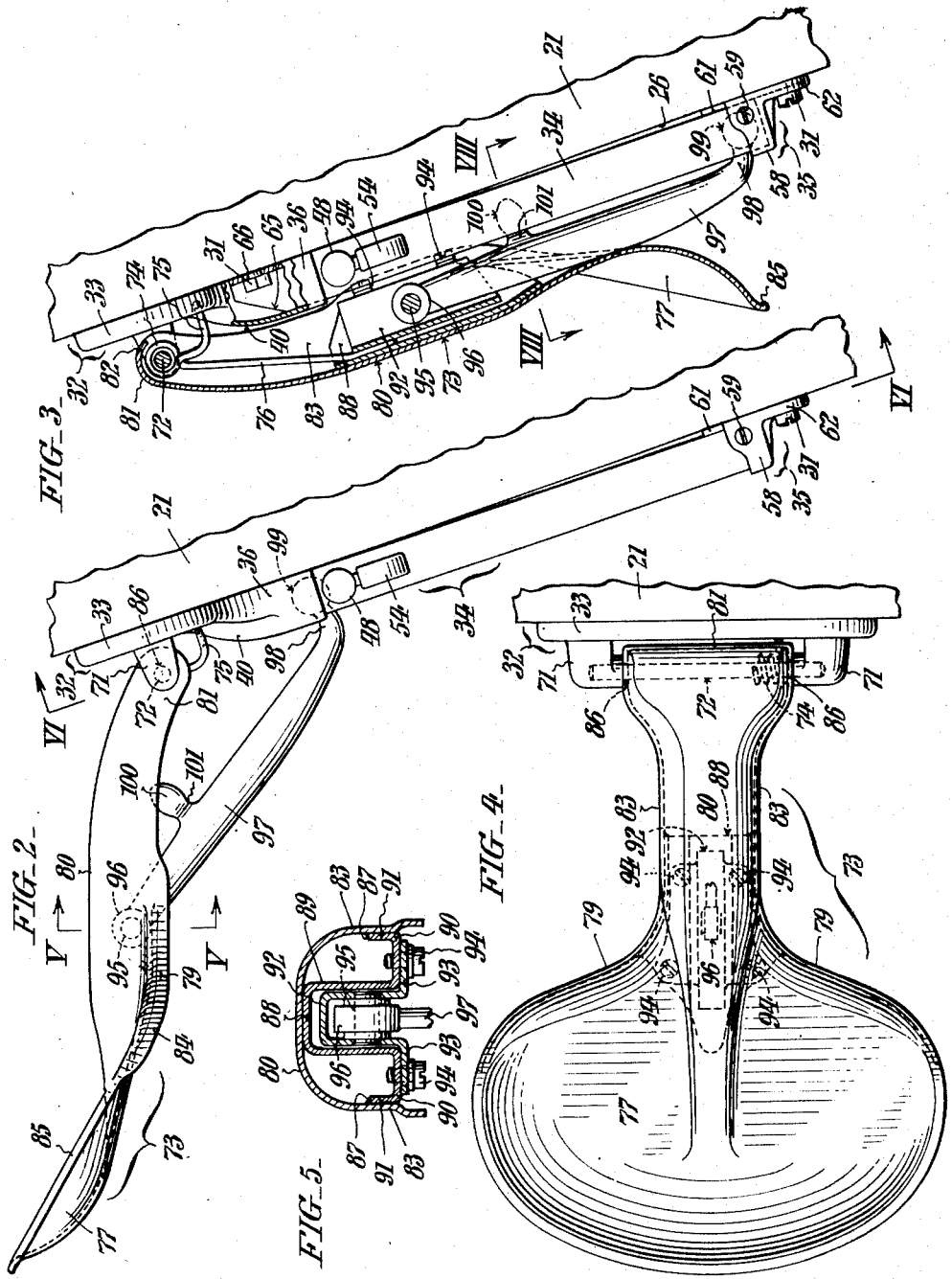
WITNESSES
INVENTOR:
Alfred B. Bell,
BY
ATTORNEYS.

April 13, 1954 A. B. BELL 2,675,056
AUXILIARY COLLAPSIBLE SEAT
Filed June 1, 1949 3 Sheets-Sheet 3
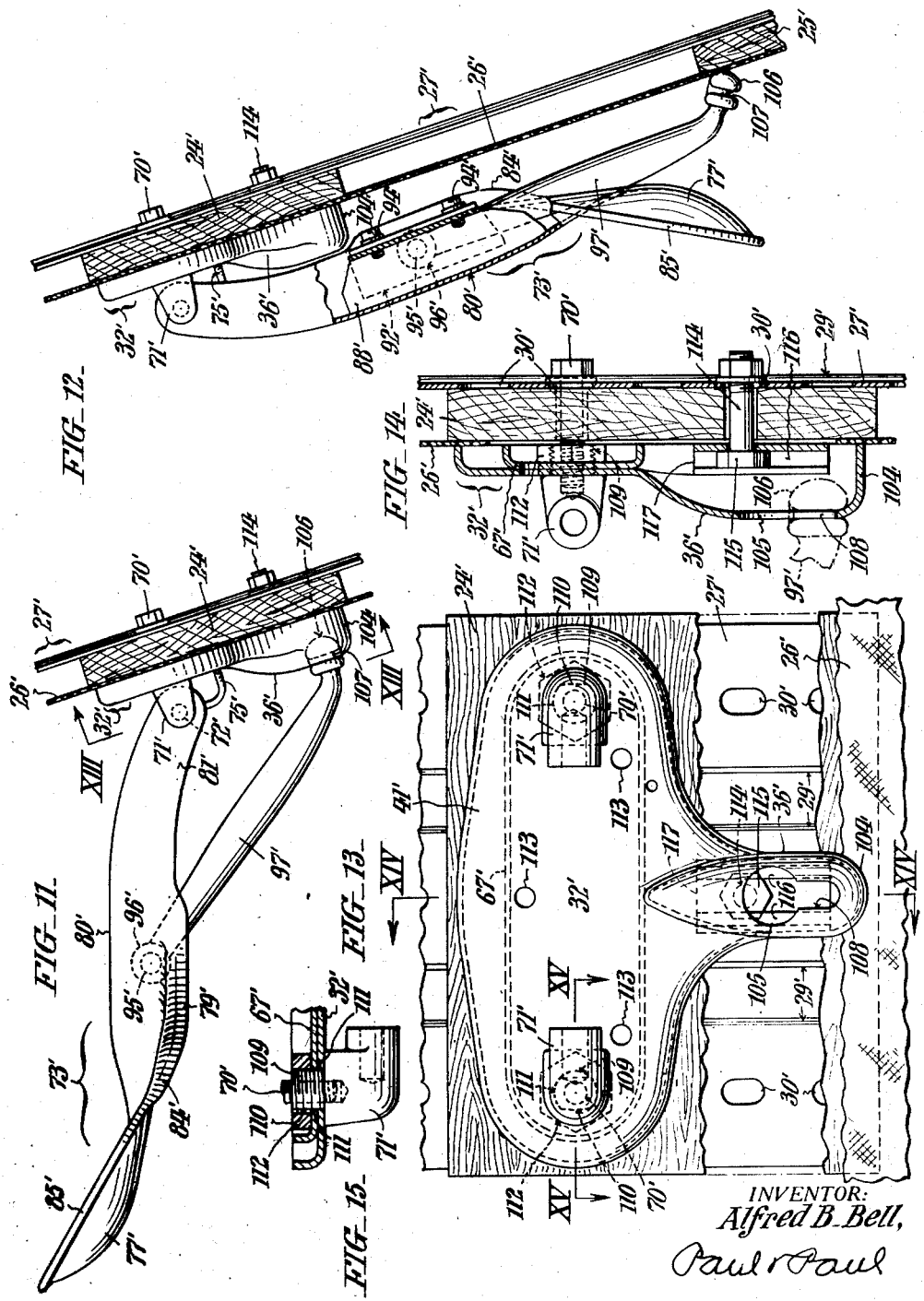
INVENTOR:
Alfred B. Bell,
Paul & Paul
ATTORNEYS.

Patented Apr. 13, 1954

2,675,056

UNITED STATES PATENT OFFICE 2,675,056

AUXILIARY COLLAPSIBLE SEAT

Alfred B. Bell, Philadelphia, Pa.

Application June 1, 1949, Serial No. 96,606

18 Claims. (Cl. 155—12)

This invention generally relates to collapsible supports or seats, and more particularly, to the species or form thereof for application to the back of vehicle seats, such as automobiles for example, whereby the seating capacity of such automobiles is increased without materially affecting the leg room or discommoding the other passengers.

The primary object of my invention is to provide a novel type of collapsible supporting device for application preferably, although not essentially, to the back of a vehicle seat whereby comfortable provision is afforded for the restful accommodation of one or more children in tandem relation.

Another object of my invention is to provide a novel form of auxiliary bucket or saddle-seating means for the convenient and safe support of a child, or a plurality of children, said means being easily attachable to the rear of the front seat of conventional passenger carrying vehicles, or automobiles where the head-room is greatest.

A further object of my invention is to provide an auxiliary collapsible bucket or saddle-seat of the type above indicated having capacity for vertical adjustment in order to ensure the maximum of riding comfort for the occupant thereof.

A still further object of my invention is to provide an auxiliary collapsible bucket or saddle-seat, as indicated in the preceding paragraph, which, when once installed, has capacity for facile movement into supporting position and collapsed retention against the rear of the associated car seat wall so as to cause no objectionable projection and be effectively prevented from rattling when in the out of use position.

Still another object of my invention is to provide an auxiliary collapsible bucket or saddle-seat of the species above defined which, when in use, will not obstruct the normal seating capacity of the automobile rear seat or adversely affect the leg room of the rear seat occupants.

A further important object of my invention is to provide an auxiliary flexible or cushioned bucket or saddle seat of the foregoing indicated species, which is designed and installed so that it affords adequate stability for, and effectively prevents side swaying of the occupant, when partially resting thereon or when fully seated.

While the foregoing definitions are indicative, in a general way, of the aims of my invention, other objects with ancillary advantages will be evident to those skilled in the art upon a full understanding of the construction, arrangement and operation, of the means hereinafter fully disclosed and illustrated by the accompanying drawings. It will also be understood that my invention is susceptible of other embodiment, or structurally modified form, coming equally within the terms and scope of the subjoined claims.

With the foregoing objects in view, my invention essentially consists of a collapsible device, for augmenting the seating capacity of vehicles, comprising an attachment support; a saddle-seat fulcrumed at its front or pommel end to said support; a brace pivoted at one end to the saddle-seat; and a terminal enlargement at the free end of the brace for interlock in a socket portion of the attachment support.

In the drawings:

Fig. 1, Sheet 1, is a fragmentary illustration showing the adaptation of one practical embodiment of my invention to the rear of an automobile front seat, with parts broken out and in section for the purpose of better disclosing otherwise obscured features, and with said seat occupied by a child in what I conveniently term a semi-erect position, or buttock-supported, with the feet on the car floor.

Fig. 2, Sheet 2, is a side elevation of the auxiliary collapsible bucket or saddle-seat of Fig 1, drawn to larger scale, in its service position or ready for occupancy.

Fig. 3 is a mainly longitudinal section of the seat in collapsed position.

Fig. 4 is a top plan view of the seat or as viewed looking downward from above Fig. 2.

Fig. 5 is a cross section taken approximately as indicated by the arrows V—V in Fig. 2.

Fig. 6, Sheet 1, is a longitudinal section taken substantially on the plane designated VI—VI in Figs. 1 and 2.

Fig. 7 is a section taken approximately on the staggered plane indicated by the arrows VII—VII in Fig. 6, and showing a locking means effective to hold the seat brace in active position.

Fig. 8 is a detail section taken on the plane designated VIII—VIII in Fig. 3.

Fig. 9 is a perspective view of a cap or socket component hereinafter fully described.

Fig. 10 is a fragmentary part plan and part sectional view of a modified form of the locking means shown by Fig. 7.

Fig. 11, Sheet 3, is a side elevation, similar to Fig. 2, of a modified form of my invention in active position.

Fig. 12 is a view, similar to Fig. 3, showing the form of my invention illustrated by Fig. 11 in the inactive or collapsed position.

Fig. 13 is a larger scale elevational view taken as indicated by the arrows XIII—XIII in Fig. 11, with the saddle-seat and its associated supporting brace removed.

Fig. 14 is a vertical section taken approximately as indicated by the arrows XIV—XIV in Fig. 13; and, Fig. 15 is a detail section taken as designated by the arrows XV—XV in Fig. 13.

In describing the forms of my invention exemplified by the accompanying three sheets of illustrative drawings, specific terms are employed for the sake of clarity; but it is to be understood the scope of said invention is not thereby limited; each said term being intended to embrace all equivalents which perform the same function for an analogous purpose.

Referring, first and more particularly to Figs. 1-10 inclusive, the reference character 16 designates the base of a conventional type car or automobile front seat 17; 18, 19 the corresponding parts of the rear seat; and 20 indicates the floor level. In conformity with more or less general practice the back 21 of the front seat 17 consists of a wood frame structure comprising spaced uprights 22 with top, bottom and intermediate transverse bars 23, 24 and 25, respectively to the front whereof the upholstered back 21 is attached, while the rear of said frame is closed-in by a sheet 26 of desirable material.

In accordance with my invention and in order to provide rigid support for the novel auxiliary seat or seats of this invention use is made of a special brace member 27, preferably, although not essentially, of sheet metal, said member having an angled lower part or foot-section 28, Fig. 1, and spaced corrugations or beads 29 for reinforcement thereof. In addition the brace member 27 is provided with spaced series of aligned slots 30, Fig. 6, in order to provide for its attachment to the seat backs of most types of automobiles, as by aid of suitable securing means such as bolts 31. Obviously the bolts 31 may have button or ornamental shaped heads; or other appropriate securing means may be employed as desired or expedient.

Connected to the outer face of the front seat closure 26, by special means hereinafter explained, is a somewhat T-shaped seat supporting device comprehensively designated 32, Fig. 6, which comprises a cross-piece or suspension component 33 having a relatively dependent guide member 34, and a special lower end socket or device 35, see Figs. 1, 6 and 9, to best advantage. More particularly, the suspension or attachment component 33 is preferably blanked out of suitable sheet material to the dished formation best understood from Figs. 1 and 6; that is to say said component 33 is mainly of somewhat elliptical contour with an inverted trowel or approximately tapering trough-like section 36 projecting from the lower medial portion thereof. The trough-like section 36, it is to be observed, embodies spaced walls 37, Fig. 6, that merge by opposed curvatures 38 into the partially surrounding wall or rim 39 of the aforesaid dished suspension component 33; whereas the web or tapering portion 40, Figs. 2 and 6, of the trough-like section 36 mergingly curves into the main wall 41 of the suspension component 33 to a rounded tip 42, see Fig. 6 to best advantage.

The guide member 34 as best understood from Figs. 7 and 8 is preferably made of springy sheet-steel to channel cross-section that is to say it embodies a flat wall or web portion 43 with spaced grip flanges 44 having their longitudinal free edge portions opposingly curved inwards at 45 to define a lengthwise extending slot 46, see Fig. 8, the purpose whereof will be hereinafter fully set forth. In addition the guide member 34 has rigidly secured to one of the flanges 44, the right-hand one, as viewed in Figs. 6 and 7 more particularly, a laterally projecting latch-device 47 conveniently consisting of a tube 48 having the outer end closed in at 49. This tube 48 is provided with a longitudinal slot 50, and houses a latch-bolt 51 under the influence of a suitable spring 52 in compression between said bolt 51 and the closed-in end 49 of the tube 48. The latch-bolt 51 is provided with a tapered inner end 53, for a purpose later on herein set forth, as well as a finger-release or retractor 54 conveniently secured to said latch-bolt 51 by aid of screw-studs 55 and spacer elements 56 operatively engaged in the longitudinal tube-slot 50 aforesaid, as readily understood by those conversant with such mechanism. Attention is directed at this juncture to the fact that the lower outer end of the seat supporting bracket inverted trowel-section 36 is provided with a central stop notch 57, the purpose whereof will be later on herein clarified.

The socket component or foot piece 35 of the seat supporting device 32, as best understood from Fig. 9, conveniently, although not essentially, embodies a cupped portion 58 of corresponding cross-section to that of the guide member 34 in order that the lower end of the latter may be frictionally seated therein and secured, for example, against axial movement by aid of suitable stud screws 59, Figs. 2, 3 and 6, passed through opposed holes 60 in the socket portion 58 and threaded into registering holes in the confronting terminal portion of said guide member 34. It is also to be noted that the socket portion 58 is provided with an upwardly directed tongue 61 and a downwardly extending pad 62 having a hole 63 for passage of the shank of one of the bolts 31 through the seat back bottom bar 25, and one of the aligned slots 30 in the brace member 27, for rigid securement in the desirable position by aid of a lock-nut 64, in an obvious manner.

The upper end of the guide member 34 preferably has the opposed inward curvatures flared at 65 (Figs. 3 and 6) outwardly from the lengthwise slot 46 to the web 43, whereas said upper end is provided with an aperture 66, Fig. 3, for passage of an attaching means such as a bolt 31, Figs. 1, 3 and 6, for its rigid securement to the car seat back bar 24, as hereinbefore set forth in connection with the brace member 27.

Securely attached to or integrated within, the hollow of the seat supporting device or suspension component 33 is a reinforcement which may be solid or, as shown, consist of an elongate sheet metal element 67 having opposed end curvatures 68 and a surrounding flange 69 for snug abutment against the seat back closure sheet 26 and intermediate bar 24. The reinforcing element 67 provides attachment, as by stud means 70, for opposed socket bearings 71, that jointly afford fulcrum support for a transverse pin 72 on which the forward end or pommel of my improved bucket or saddle-seat 73 is mounted with capacity for pivotal movement in opposition to the restraining action of a coil spring 74 about said pin 72. The terminal end portions 75, 76 of the spring 74 are, respectively, conveniently anchored through a hole in the main wall 41 of the suspension component 33, Fig. 6, and below the saddle-seat 73, Fig. 3, as later on again referred to.

The saddle-seat 73 of my invention, as best shown by Figs. 2-5 inclusive, is preferably fabricated or blanked out of sheet metal to embody a mainly elliptical and inclined, as well as partly concaved body supporting area or seat-section 77 for partial or full reception of the user's buttocks or rump 78, Fig. 1. It is also to be noted that the saddle-seat 73 embodies opposed flares 79 that merge into an inverted channel-section shank 80 having its forward end or pommel laterally expanded at 81 and rolled or turned inwardly at 82, Fig. 3. It is further observable that the side flanges 83 of the shank 80 embody undulate edges 84 that rearwardly merge into a beaded stiffening or protective lip 85, Figs. 2 and 3, about the body supporting area or section of the saddle-seat 73, for purposes of rigidity; also that the forward ends of said flanges 83 are appropriately pivoted at 86 on the transverse pin 72 intermediate the socket bearings 71, hereinbefore explained.

Intermediate the ends of the saddle-seat 73 and rigidly secured, as by welds 87, Fig. 5, is a multiple channel-section reinforcement 88 of determinate length, said reinforcement 88 being blanked from sheet metal to include a main channel portion 89, the web whereof abuts the inner underside of the shank 80, and relatively-reversed flanking or spaced channels 90, the outer flanges 91 whereof are conveniently integrated by the welds 87 to the inner face of the shank side flanges 83 as readily understood on reference to Fig. 5, more particularly. Mounted within the hollow of the main channel portion 89, is another channel section device or bearing member 92 embodying angularly related flanking flanges 93 for abutment against the web portions of the spaced channels 90 aforesaid, and attachment thereto by set-screws 94, in an obvious manner. Fulcrumed between the parallel sides of the bearing member 92 by a pin 95 is the apertured end 96 of a pivotal brace 97 effective to sustain the saddle-seat 73 in the active position of Figs. 1 and 2. The brace 97 it will be seen embodies, at the end remote from the pivot pin 95, a relatively cranked offset 98 with a terminal enlargement or ball 99, as well as a laterally related taper-section tooth 100 intermediate the ends of said brace element 97. Attention is directed, at this juncture, to the facts that the terminal ball 99 is of a diameter for passage up and down within the hollow of the dependent guide member 34, while the cranked offset end portion 98 is of the cross-section best shown in Figs. 2, 3 and 7, for slidable coaction and snap engagement in the guide member lengthwise slot 46; whereas the tooth 100 is of the cross section best shown in Fig. 8, that is to say it includes opposed groovings 101 Figs. 2 and 3, at the root of the taper section tooth 100, of a cross-section likewise capable of entry into and movement down the guide-slot 46 when the saddle-seat 73 is collapsed, or in the out of service position shown by Fig. 3, and as hereinafter fully explained.

Referring now to Fig. 10 which shows a modified form of the latch device 47 previously described, said modified or automatic latching and releasing device 47' comprises axially aligned tubes 48' housing opposed slidable latch-bolts 51' that are inwardly influenced relative to the guide member 34 by springs 52' intermediate the outer ends of said latch-bolts 51' and screw-plugs 102 threadedly engaged in the free ends of the respective tubes 48'. The bolts 51' have limited slidable movement as defined by the longitudinal slots 50', and stud means 55' with spacer elements 56'; while it is to be particularly noted that no finger release means is required, for retraction purposes, inasmuch as the confronting ends 103 of the bolts 51' are opposedly beveled or wedge-shaped for up and down coaction with the cranked end portion 98 of the seat bracing element 97, as hereinbefore set forth.

Turning now to the modified form of my invention illustrated by Figs. 11-15 inclusive, all parts having equivalents in the preceding description are correspondingly designated by like reference characters with an added prime exponent, and only the differentiating parts or features will be described in order to obviate unnecessary repetitive explanation. It is to be primarily noted, however, that the predominating distinction resides in the fact that the modified form of my invention may be defined as of fall-down character, in that the dependent guide member 34 and socket device 35 are dispensed with; also that the seat sustaining brace 97' may be termed pendulous and recoil influenced to the inactive position of Fig. 12. In this form of my invention the T-shaped seat supporting device 32' substantially conforms to that of the preceding description of the part 32 excepting as regards the section 36', which has the lower end elbowed over at 104 into the general plane of the inner face of said device 32', and that the section 36' is equipped with a key-hole opening 105 for passage therethrough of the knob-like end 106 of the seat bracing element 97'. It is further noticeable that the upper or approximately circular part of the key-hole opening 105 is of a size permitting entry and exit of the brace knob-like end 106, whereas said end is eccentrically grooved at 107, for seating engagement in the parallel or slotted lower portion 108 of the key-hole opening 105. Attention is also drawn to the manner of securing the opposed socket bearings 71' to the suspension component 32' and reinforcement 67', see Figs. 13-15, in order that said bearings 71' may be rigidly maintained in direct axial alignment as well as positively restrained against turning movement. Each of the respective bearings 71' is provided with an exteriorly screw-threaded stub 109 having a segmental flat 110, said stub being adapted for snug passage through correspondingly shaped registering holes 111 in the suspension component 32' and the reinforcement 67', as clearly understandable from Figs. 13 and 15, more particularly. An appropriate nut 112 is thereupon applied to the stub 109 for abutment against the inner face of the reinforcement 67' in order to rigidly lock the parts 71', 32' and 67' against relative movement, whereby the bearings 71' are positively secured in direct opposing alignment. It is to be also remarked that each bearing stub-portion 109 is axially bored and screw-threaded for reception of the attaching stud means 70', hereinbefore referred to; whereas the main wall 41' of the suspension component 32' is provided with staggeringly related holes 113 for application of an additional mounting element or elements such as a bolt 114 which is restrained against rotation by having the head 115 thereof engaged in opposed channel shaped flanges 116 of an arrester member 117 seating in the hollow of the suspension component section 36', as readily understood by those conversant with such means.

118, Fig. 1, designates a conventional "robe" strap or straps mounted to the upper rear portion of the automobile front seats for coat or blanket suspension, and also serviceable to aid persons in getting up from, or lowering themselves onto, the rear seat 18, 19.

From the foregoing it will be readily understood that by my invention I have provided an efficient auxiliary seating means 73 or 73' which, when installed, can be raised into the active or usable position with a minimum of physical effort and, vice versa, just as readily collapsed or folded against its supporting means, the back of the front seat 17, with no objectionable interfering obstruction into the leg-room space intervening said front seat and the back seat 19. It is also clear that either form of the invention affords perfect stability to the user thereof; for example, incidental to the easy vertical adjustment of the seat-supporting device 32 relative to the floor level 20 it is obvious that the level of the seat 73 can be variably inclined or set so that a boy or girl seated astride thereof is comfortably supported with his or her body stabilized between said seat 73 and the back of the car front seat 17, and with both feet, resting on the floor 20 in a spread position, while both hands can grip the robe strap 118, such boy or girl is able to laterally brace themselves against all prevailing car shocks tending to disturb the normal riding balance.

Noticeably the seat 73 or 73' is so located that it affords a clear front and/or side view with but little or no inconvenience to the other occupant or occupants of the car in which one or more of my improved auxiliary seats is or are installed. It is also self-evident that a suitably-shaped sponge rubber pad or cover may be secured on the seat 73 or 73' for additional riding comfort without departing from the scope of my invention.

Furthermore, my improved auxiliary collapsible seat as hereinbefore disclosed is of an exceedingly simple and efficient construction, while the main parts are readily blanked out from sheet-metal and shaped to afford the maximum strength and durability; as well as of a type for easy assembly, set-up, or dismantling. In addition it is clearly apparent that the form of my invention shown, by Figs. 1 to 9 inclusive when installed, simply entails raising the seat 73 manually, aided by the spring 74, from the inactive or collapsed position of Fig. 3 to that of Fig. 2, whereupon said seat is automatically arrested by the latching means 47 or 47', and stationarily held until the means 47 is retracted by the finger release 54; or, when the latching means 47' is used, by pressing down on the seat 73 to forcibly separate the opposing latch bolt 51 or bolts 51', in an obvious manner. On the other hand with the modified form of my invention shown by Figs. 11 to 15 inclusive, raising of the seat 73' is effected, as aforesaid, but it is noteworthy that the knob-like end 106 of the dependent brace-element 97' must be passed through the key-hole opening 105 and seated in the elbowed end 104 of the trowel section 36' with the part 107 of the knob end 106 engaged in the slot 108 of said key-hole opening. It is also noteworthy that to release the seat 73' it is necessary to first slightly raise the seat 73' to disengage the brace knob like end 106 from the elbow portion 104 of the supporting bracket section 36', in an obvious manner.

From the foregoing it is felt the merits and advantages of my invention will be clearly understood, and while I have shown and described practical embodiments thereof, the same are by way of illustration only and I consider as my own all such modifications thereof as fairly come within the terms and scope of the following claims.

Having thus described my invention, I claim:

1. An auxiliary collapsible seat, for augmenting the passenger carrying capacity of automobiles and other vehicles, comprising an adjustable dished component or attachment-support including a dependent tubular guide with a socket at the lower end, and a movement-limiting slot lengthwise of said guide; a saddle-seat fulcrumed at its pommel end to the attachment support by a recoil-influenced pivot means; a brace pivoted at one end to the saddle seat and having an angularly-related taper projection intermediate its ends, and wherein said projection embodies spaced grooves for snap engagement into and out of the saddle-seat guide slot; a terminal enlargement at the free end of said brace, also engaged in and movable lengthwise along the bore of the tubular guide; a laterally directed latch means engageable below the brace terminal enlargement to sustain the saddle-seat in body-supporting position; and means effective to influence the saddle-seat into collapsed position and to positively prevent said seat from accidental displacement when collapsed.

2. An auxiliary collapsible seating-device, for augmenting the passenger carrying capacity of vehicles, comprising an adjustable attachment support having a dependent tubular guide with a socket at the lower end; a saddle-seat fulcrumed at its pommel end to said support; a brace pivoted at one end to the saddle-seat; a terminal enlargement at the free end of said brace, engaged in the dependent guide of the attachment support, and having capacity for slidable movement up and down said guide; latch means operative to arrest and hold the saddle-seat in body supporting position; and means effective to rigidly hold the saddle-seat collapsed and to positively restrain the same from rattling or accidental displacement.

3. An auxiliary collapsible seat, for augmenting the passenger carrying capacity of automobiles and other vehicles, comprising an adjustable attachment support including a dependent tubular guide with a socket at its lower end, and a movement-limiting slot lengthwise of said guide; a saddle-seat fulcrumed at its cantle end to the attachment support; a brace pivoted at one end to the saddle-seat and having a terminal enlargement at its free end movable within the tubular guide, and said enlargement having adjoining opposed reductions cooperative with the confronting edges of the tubular guide slot aforesaid; laterally directed latch means operative to sustain the saddle-seat in body supporting position; and recoil means effective to influence the saddle-seat into collapsed position and to positively prevent said saddle-seat from movement or accidental displacement when collapsed.

4. The invention of claim 1 wherein the brace member is preferably of sheet metal, having an angled foot-section; and spaced corrugations lengthwise of said brace member with intervening series of aligned slots, whereby the auxiliary collapsible seat may be selectively attached to the back frame structure of an automobile or other vehicle seat at the desirable elevation.

5. The invention of claim 1 wherein the adjustable dished component or attachment support is of approximately elliptical contour with a trough-like projection; wherein the longitudinally open tubular guide is dependently engaged in the trough-like projection and includes a socket portion at its lower end; and wherein the said longitudinally open tubular guide and trough-like projection socket portion jointly define the motion-limiting means controlling elevation and collapse of the saddle-seat.

6. The invention of claim 1 wherein the dished component or attachment-support consists of sheet metal, and the tubular guide is of springy steel for compressive engagement in the trough-like projection and the socket portion of the tubular guide.

7. The invention of claim 1 wherein the dished component or attachment-support further includes an integrated elongate sheet metal reinforcement having opposed curvilinear ends, and wherein said reinforcement embodies a surrounding flange of a depth to planarly abut the seat back to which the attachment support is applied.

8. The invention of claim 1 wherein the dependent tubular guide is of channel cross-section with the opposed flange edge portions opposingly curved inwards to define gripping portions; and wherein the upper end portions of said flanges include opposed curvatures affording entrance thereinto for the brace terminal enlargement.

9. The invention of claim 1 wherein the guide member socket is in the form of a cupped component of corresponding cross-section to that of the tubular guide; and wherein said socket embodies an upwardly directed tongue and a downwardly extending attachment pad.

10. The invention of claim 1 wherein the saddle-seat is preferably blanked out of sheet metal to embody a mainly elliptical and inclined, as well as a partly concaved pommel or body supporting portion; and wherein said supporting portion includes opposing flares that merge into an inverted channel-shaped shank, the forward section whereof is laterally expanded, and the free end rolled downwards to define the pommel or fulcrum end of said saddle seat.

11. The invention of claim 1 wherein the body supporting portion, of the saddle seat, has its free edge suitably reinforced or beaded; and wherein the edges of the shank opposing flanges are undulated and rearwardly merge into the reinforced or beaded edge of said body supporting portion.

12. The invention of claim 3 wherein the brace is fulcrumed intermediate the ends of the saddle-seat by aid of a multiple channel-section bearing integrated to the lower face of said saddle-seat; and wherein the free end of the brace is angled and embodies a terminal ball section having inwardly related adjoining grooves for engagement between the tubular guide slot confronting edges.

13. The invention of claim 1 wherein the brace taper projection is of tooth formation with opposed grooves at its root for coaction with the tubular guide lengthwise slot edges and thereby serve to retain the saddle-seat rigid when collapsed.

14. The invention of claim 1 wherein the latch means comprises a spring-influenced bolt operative in a suitable casing laterally sustained by the dependent tubular guide; wherein said bolt embodies a taper inner end; and wherein said bolt is retractable by an attached finger release.

15. The invention of claim 1 wherein the latch means comprises axially-aligned opposingly-shiftable spring-influenced bolts having wedge-shaped confronting ends whereby the saddle-seat is automatically arrested in active position and correspondingly released by downward pressure on said seat.

16. An auxiliary collapsible seat, for augmenting the passenger carrying capacity of automobiles and other vehicles, comprising a vertically adjustable attachment support of approximately elliptical contour with an elbowed hollow projection having a key-hole in the wall thereof, a saddle-seat fulcrumed at its cantle end to the attachment support; a brace pivoted at its free end, said knob like portion having capacity for passage through the eye of the key hole and movement down the slot of such key hole for seating in said hollow projection, whereby the saddle-seat is sustained in raised position and, vice versa, is releasable therefrom when said seat is to be collapsed; and recoil means effective to hold the saddle-seat against rattling or displacement when collapsed.

17. The invention of claim 1 wherein the saddle seat is mounted to the attachment support by aid of a transverse pivot pin; wherein said pivot pin is journaled in opposed socket bearings secured to the attachment-support head portion; wherein each such bearing embodies an exteriorly screw-threaded stub having a lengthwise segmental reduction or flat for engagement through a complementally shaped hole in the attachment support for maintenance of said bearings in direct axial alignment; and wherein each said socket bearings is respectively equipped with a lock nut for rigid securement thereof against rotative movement.

18. The invention of claim 1 wherein the pivot recoil means influencing the saddle-seat into collapsed position consists of a coil spring about said pivot-pin; and wherein said spring has one end anchored in the attachment support with the other end socketed to the under face of the saddle-seat, whereby the terminal enlargement end of the brace is caused to firmly abut the back of the automobile or other vehicle seat.

References Cited in the file of this patent

UNITED STATES PATENTS

| Number | Name | Date |
|---|---|---|
| 1,227,640 | Marguardt | May 29, 1917 |
| 1,232,874 | Whealen | July 10, 1917 |
| 1,366,405 | McGowan | Jan. 25, 1921 |
| 1,629,834 | Miller | May 24, 1927 |
| 1,790,468 | Frank et al. | Jan. 27, 1931 |
| 2,413,168 | Coffrey | Dec. 24, 1946 |
| 2,499,103 | Love | Feb. 28, 1950 |

FOREIGN PATENTS

| Number | Country | Date |
|---|---|---|
| 10,885 | Great Britain | June 5, 1895 |